US005794240A

United States Patent [19]
Yamashita

[11] Patent Number: 5,794,240
[45] Date of Patent: Aug. 11, 1998

[54] MULTI-THREADED SORTING SYSTEM FOR A DATA PROCESSING SYSTEM

[75] Inventor: Haruhisa Yamashita, Kawasaki, Japan

[73] Assignee: Fujitsu Limited, Kawasaki, Japan

[21] Appl. No.: 67,087

[22] Filed: May 26, 1993

[30] Foreign Application Priority Data

| May 26, 1992 | [JP] | Japan | 4-134025 |
| Sep. 17, 1992 | [JP] | Japan | 4-246954 |

[51] Int. Cl.⁶ ......................................... G06F 17/30
[52] U.S. Cl. ............................ 707/7; 395/670; 395/672
[58] Field of Search ............................ 395/600, 650, 395/800, 607, 677, 670, 672; 364/222.9, 282.1

[56] References Cited

U.S. PATENT DOCUMENTS

| 4,210,961 | 7/1980 | Whitlow et al. | 395/600 |
| 4,587,628 | 5/1986 | Archer et al. | 395/600 |
| 4,949,255 | 8/1990 | Gerth et al. | 395/725 |
| 5,084,815 | 1/1992 | Mazzario | 395/800 |
| 5,089,985 | 2/1992 | Chang et al. | 395/600 |
| 5,355,488 | 10/1994 | Cox et al. | 395/650 |
| 5,410,689 | 4/1995 | Togo et al. | 395/600 |
| 5,414,842 | 5/1995 | Archer et al. | 395/607 |

FOREIGN PATENT DOCUMENTS

| 63-049927 | 3/1988 | Japan . |
| 63-229522 | 9/1988 | Japan . |
| 1-092830 | 4/1989 | Japan . |

OTHER PUBLICATIONS

"Writing Multithreaded Code on Solaris", Kleiman et al., SunSoft Inc., 1992 IEEE, Mar. 1992.

"Solaris 2.0: SunSoft debuts Shrink-wrapped Distributed Computing Solutions—Solaris", EDGE: Work-Group Computing Report, v2, n68, p. 1(1), Sep. 1991.

"Planning and Writing a Multithreaded OS-2 Program with Microsoft C", Richard Hale Shaw, Microsoft Systems Journal, v4, n2, p. 63(18), Mar. 1989.

"Multiple Threads for UNIX DBMS", Jeff Moad, Datamation, v38, n6, p. 73(2), Mar. 1992.

Ward et al., Computation Structures, 1990, pp. 533–550.

Primary Examiner—Thomas G. Black
Assistant Examiner—Hosain T. Alam
Attorney, Agent, or Firm—Staas & Halsey

[57] ABSTRACT

A sorting system for a data processing system using buffers. A first thread is provided for performing an input/output process in which records received from an application program are written into the buffers and the records after sorting are transferred to the application program. A second thread is provided for performing a sorting process for the records in the buffers and writing the records into the buffers after the sorting process is completed.

18 Claims, 11 Drawing Sheets

EXPORT BSORT_TMP = / TMPVOL1: / TMPVOL2: / TMPVOL3

MULTI-THREADED SORTING SYSTEM FOR A DATA PROCESSING SYSTEM

BACKGROUND OF THE INVENTION

1. Field of the Invention

The present invention generally relates to a sorting system for a data processing system.

2. Description of the Prior Art

A data processing system which handles a large amount of data typically needs a sorting process while a program, such as a COBOL application or a database process, is being processed. Such a data processing system is widely used by financial companies.

Figure 1A:
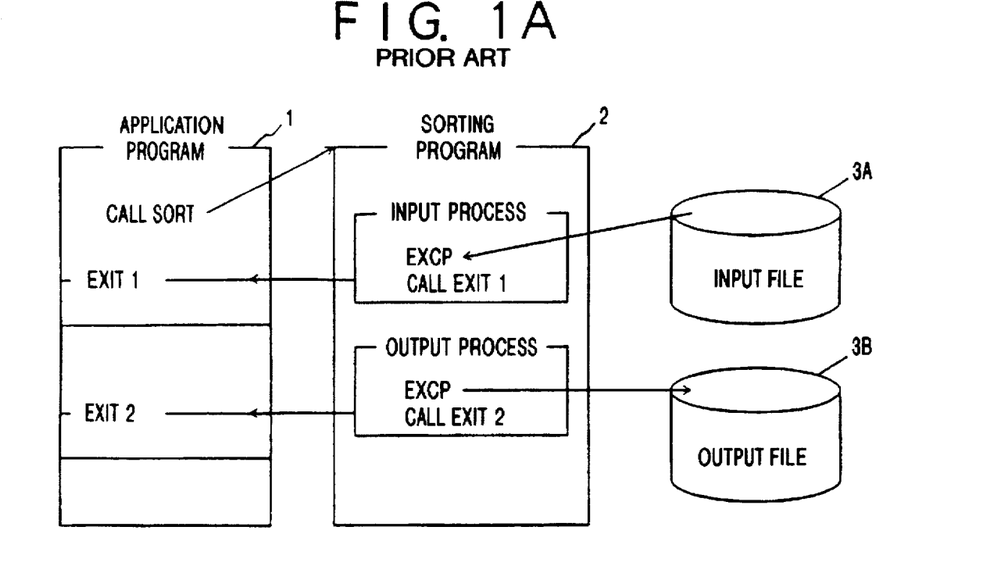
FIG. 1A is a block diagram of a conventional sorting system.

FIG. 1A is a diagram illustrating a conventional sorting process. In execution of an application program, a conventional sorting process or system is carried out as follows. When an application program 1 being executed needs sorted data, the application program 1 calls a sorting program 2. The sorting program 2 reads necessary data from an input file 3A by sending an I/O instruction EXCP to the input file 3A, and then sorts the read data. That is, the read data is rearranged in a requested order. The above I/O instruction EXCP is based on the physical structure of a database in which the input file 3A is stored. That is, the I/O instruction EXCP includes information indicating a channel and address relating to an area in which the data to be sorted is stored. Normally, the I/O instruction EXCP is an asynchronous I/O instruction intended to transfer data at high speed.

After the sort is completed, the sorting program 2 calls a task exit (address information) 1 of the application program 1. Then, the application program 1 performs a process from the task exit 1.

When the application program needs to store sorted data in an output file 3B in the database, the sorting program 2 performs the I/O instruction EXCP, after receiving a call from the application program 1 and receiving data from the application program 1, by accessing a task exit 2 of the application program 1. Then, data is sorted and written into the output file 3B.

When the above sorting process is applied to an open system, such as a UNIX system, the description language (a C language, for example) of the open system needs to separate a module of a main routine of the application program and modules of programs (exit routines) respectively starting from the task exits 1 and 2. Hence, it is very difficult to provide a common access for use of data to the main routine and to the exit routines.

The above problem will now be described in more detail with reference to FIG. 1B, which shows a stack structure of the system shown in FIG. 1A. As shown in FIG. 1A, a stack area of the main routine of the application program 1 is formed in the stack structure. The beginning address of a stack area of the main routine is indicated by a stack pointer SP1. Next, a stack area of the sorting program 2 is formed following the stack area of the main routine. The beginning address of the stack area of the sorting program 2 is indicated by a stack pointer SP2. Then, a stack area of the exit routine starting from the exit 1 or 2 shown in FIG. 1A is formed following the stack area of the sorting program 2. The beginning address of the stack area of the exit routine is indicated by a stack pointer SP3.

Figure 1B:
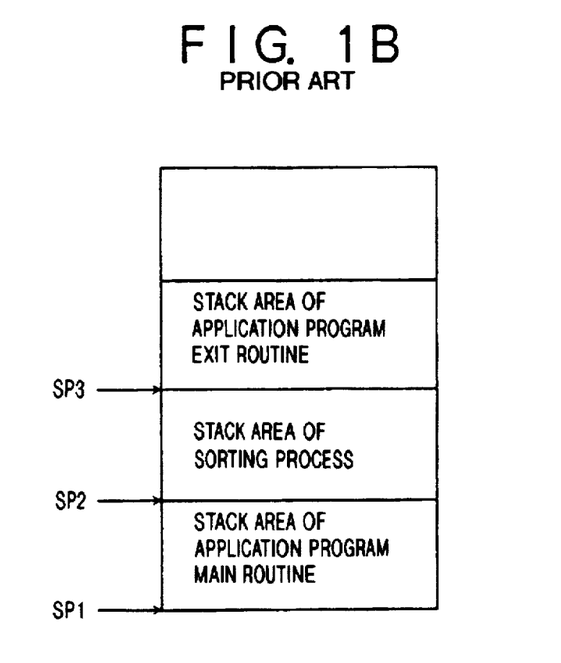
FIG. 1B is a diagram of a conventional stack structure.

As can be seen from FIG. 1B, that the stack area of the sorting program 2 is interposed between the stack area of the main routine and the stack area of the exit routine. Hence, it is very difficult to provide common access to the stack areas.

In other words, it is very difficult to access the main routine from the stack area of the exit routine, and it is also very difficult to access the stack area of the exit routine from the stack area of the main routine. As has been described, the main routine calls the sorting program 2, which calls the exit routine after sorting. This reduces the advantage gained using the high-speed I/O instruction EXCP and decreases the file access speed.

SUMMARY OF THE INVENTION

It is a general object of the present invention to provide a sorting system for a data processing unit in which the above disadvantages are eliminated.

A more specific object of the present invention is to provide a sorting system capable of efficiently performing a sorting process at high speed.

These objects of the present invention are achieved by a sorting system for a data processing system comprising buffers, a first thread for performing an input/output process in which records received from an application program are written into the buffers and the records after sorting are transferred to the application program; and a second thread for performing a sorting process for the records in the buffers and writing the records into the buffers after the sorting process is completed.

Alternatively, the records to be sorted may be read from an input file and after sorting the records may be transferred to an output file.

It is preferable that the sorting system further comprises a plurality of storage units in which a plurality of temporary files are respectively formed, a second group of buffers coupled to the second thread and used to perform the sorting process by the second thread, and means for performing a first process for writing the records to be sorted into the second group of buffers and reading the records from the second group of buffers and for performing a second process for transferring the records from the second group of buffers to the plurality of temporary files in the plurality of storage units when the buffers of the second group are full.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 2A:
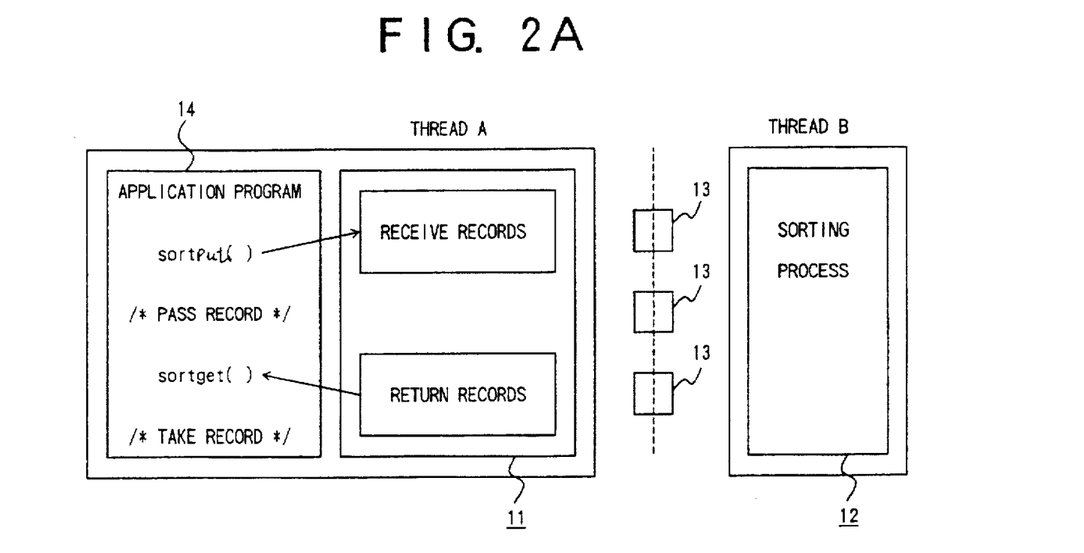
FIG. 2A is a block diagram of a first embodiment of the present invention.

FIG. 2A shows a sorting system according to the first embodiment of the present invention. A thread A is a CPU execution unit which performs a record input/output program 11 and stores an application program 14. The thread A will be described in detail later. A thread B is another CPU execution unit which performs a sorting process or program 12. A plurality of buffers 13 are provided between the thread A and the thread B and are used to transfer records between the threads A and B. That is, the buffers 13 can be accessed by both threads A and B.

The input/output program 11 in the thread A performs an input/output operation on records relating to the sorting program 12. The input/output program 11 includes a process for receiving records from the application program, and a process for returning records to the application program 14.

The sorting program 12 in the thread B actually sorts records. The threads A and B can operate in a parallel manner. The application program 14 and the input/output program 11 are both provided in the single thread A. With this arrangement, it becomes possible to continuously arrange a stack area of the application program 14 and a stack area of the input/output program 11 in a stack structure (b-1), as shown in FIG. 3B. Hence, it is possible to access the stack area of the application program 14 from the input/output program 11 and to access the stack area of the input/output program 11 from the stack area of the application program 14.

Figure 3A:
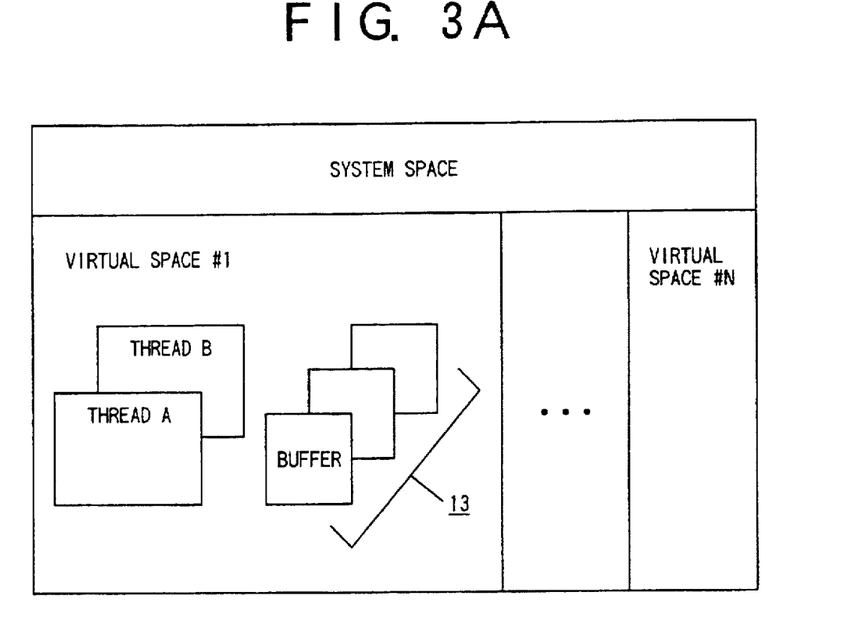
FIGS. 3A and 3B are diagrams showing an overview of a sorting system according to a first embodiment of the present invention.
Figure 3B:
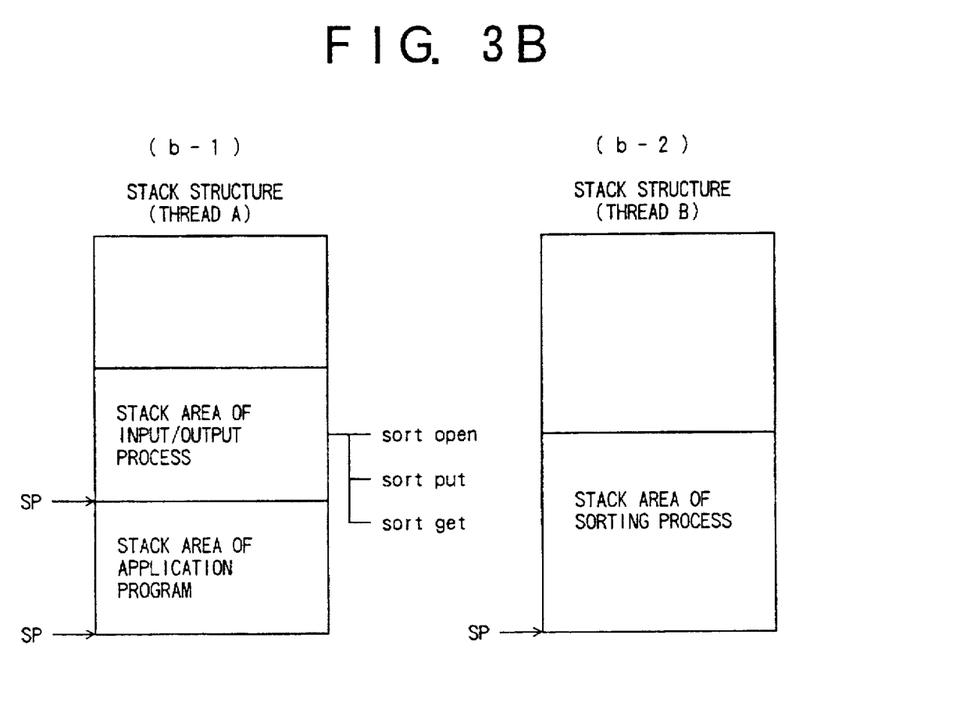

FIG. 3A shows the entire system space of a data processing system equipped with the sorting system according to the first embodiment of the present invention. The entire system space includes a system space, and a plurality of virtual spaces #1 through #N where N is an integer. The virtual space #1 includes the threads A and B, and the buffers 13. The threads A and B in the virtual space #1 are independent CPU execution units. That is, the threads A and B are formed by a single CPU and operate in a time sharing manner. Alternatively, the threads A and B are formed with respective CPUs. The system space is used to store a system program, such as a kernel program.

FIG. 3B shows the stack structures of the data processing system equipped with the sorting system in accordance with the first preferred embodiment of the present invention. The stack structure (b-1) is the stack structure of the thread A. As has been described previously, the thread A performs the application program 14 and the input/output program 11. The stack area of the application program 14 and the stack area of the input/output program 11 are continuously formed in the stack structure of the thread A. Since the stack areas of the application program 14 and the input/output program 11 are continuously formed, it is possible to access the stack area of the application program 14 from the stack area of the input/output program 11 and access the stack area of the input/output program 11 from the application program 14. Hence, the disadvantages due to the stack structure shown in FIG. 1B is eliminated.

The stack structure (b-2) is the stack structure of the thread B. The sorting program 12 is operated by the thread B, and hence only a stack area of the sorting program 12 is formed in the stack structure of the thread B.

Figure 4:
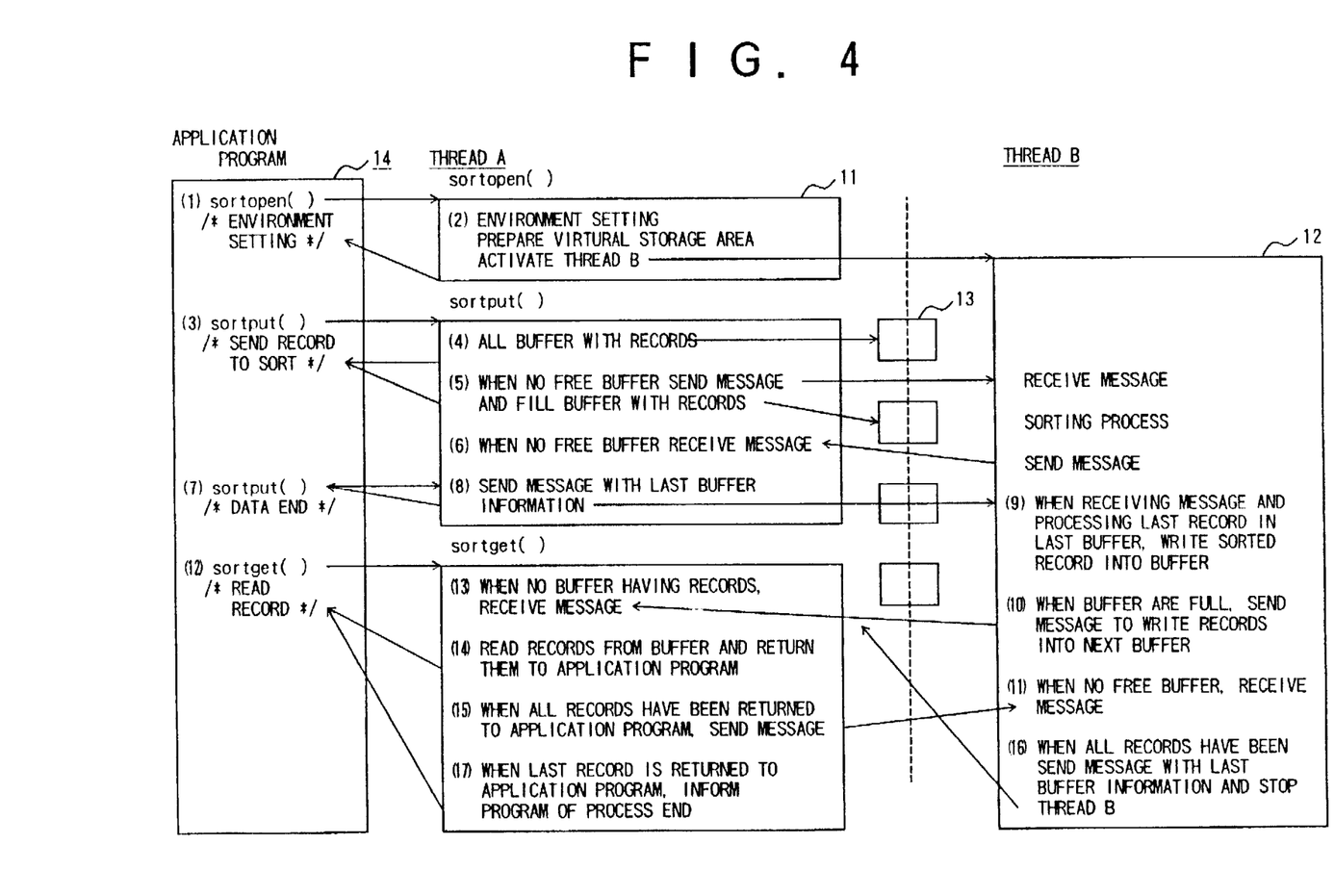
FIG. 4 is a diagram showing the operation of the first embodiment of the present invention shown in FIG. 2A.

A description will now be given of the operation of the sorting system in accordance with the first embodiment. FIG. 4 shows a sequence in which a record from the application program 14 is given to the sorting program 12, which performs sorting and then sends the record after sorting to the application program.

In step (1), the application program 14 issues an environment setting function "sortopen ( )" for sorting. In this case, a parameter is specified which functions as file information and indicates that a record is to be input from the application program 14 and a record after sorting is to be output to the application program 14.

In step (2), the input/output program 11 receives the environment function "sortopen ( )", prepares an area for the thread B in the virtual storage area, and loads the sorting program 12 to the above area. Then, the input/output program 11 returns control to the application program 14.

In step (3), the application program 14 prepares a record, and issues a function "sortput( )" for passing the record to the input/output program 11.

In step (4), the input/output program 11 executes the function "sortput( )", and writes the received record into one of the buffers 13. Then, the input/output program 11 returns control to the application program 14. If it is determined, in step (5), that there is no available area in the buffers 13, the input/output program 11 sends a message to the thread B in order to instruct the thread B to sort the record in one of the buffers 13. Hence, a free buffer area becomes available, and the input/output program 11 identifies the free buffer 13 and writes the record into the free buffer 13. In step (6), if there was no available buffer and waits for a message indicating that one of the buffers 13 has become free due to execution of the sorting from the thread B.

When it is determined, in step (7), that all records in the application program 14 to be sorted have been passed to the input/output program 11 (the function "sortput ( )", the application program 14 issues the function "sortput ( )" to which information indicating the end of data is added.

When the input/output program 11 (the function "sortput ( )" acknowledges the end of data in step (8), it adds information indicating the record being processed is the last record and sends a corresponding message to the thread B. Then, the input/output program 11 returns control to the application program 14.

In step (9), the thread B receives the message, and writes records obtained since the last record is processed into the free buffer 13.

In step (10), when it is determined, by the sorting program 12, that all the buffers 13 have become full of records, the thread B sends a message to the input/output program 11 (a record returning function "sortget ( )"), and writes a record into the next buffer 13. If it is determined, in step (11), that there is no free buffer 13, the thread B switches to a message receiving state in order to wait for a message indicating return of at least one buffer 13 from the input/output program 11 (function "sortget ( )").

In step (12), the application program 14 issues the record returning function "sortget ( )" in order to receive a record after sorting.

When it is determined, in step (13), that there is no buffer 13 in which a record after sorting is stored, the input/output program 11 waits for a message indicating return of at least one buffer 13 from the thread B.

When it is determined, in step (14), that the above message is received or there is one buffer 13 in which a record not returned to the input/output program 11, the input/output program takes the record from the buffer 13 being concerned, and returns the above record to the application program 14.

When it is determined, in step (15), that all records in the buffers 13 have been returned to the application program 14, the thread A sends a message indicating return of the buffers 13 to the thread B. When all the records are written into the buffers 13 in step (16), the thread B sends a message with information indicating the buffer 13 having the last record to the thread A, and ends the sorting program 12.

In step (17), when the input/output program 11 (function "sortget ( )") of the thread A takes the last record from the buffer 13 indicated in the message, the input/output program 11 determines that all the records have been received, and informs the application program 14 of the above determination result.

As described above, the records from the application program 14 of the thread A are received by the input/output program 11 of the thread A, which writes these records into the buffers 13.

Then, the sorting program 12 is carried out, and the records obtained by sorting are written into the buffers 13 and then transferred to the application program 14 of the thread A via the input/output program 11. Hence, it is possible to operate the input/output program 11 of the thread A and the sorting program 12 of the thread B in parallel to perform sorting at high speed. In addition, it is possible to mutually and continuously access the stack areas of the application program 14 and the input/output program 11.

Figure 2B:
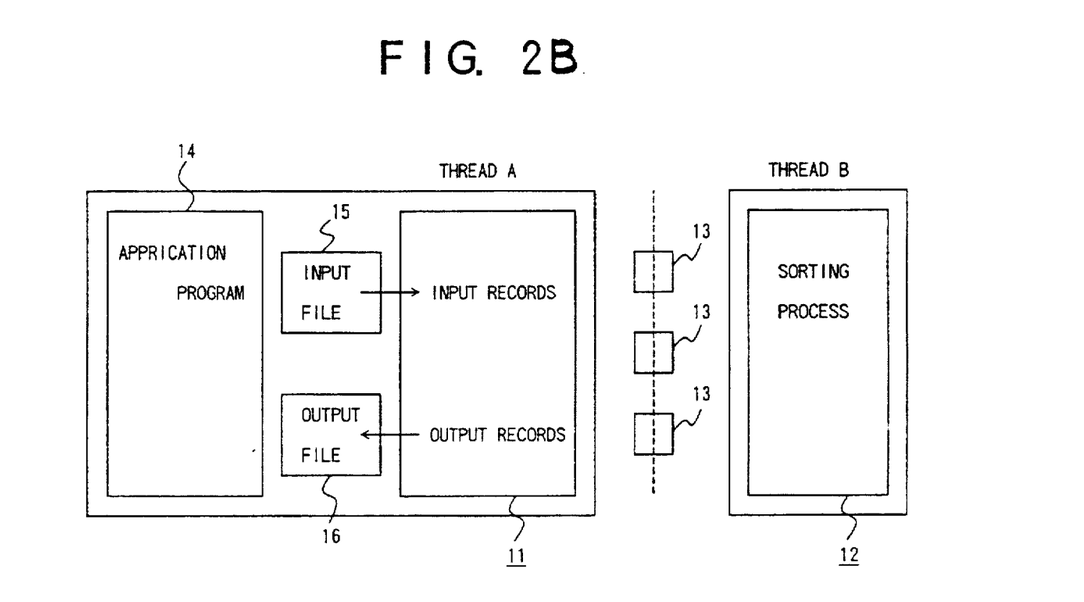
FIG. 2B is a block diagram of a variation of the first embodiment of the present invention.

FIG. 2B shows a variation of the system structure shown in FIG. 2A. The thread A includes an input file 15 and an output file 16. A record specified by the application program 14 is read from the input file 15 and output to the input/output program 11. A record after sorting is output from the input/output program 11 to the output file 16.

Figure 5:
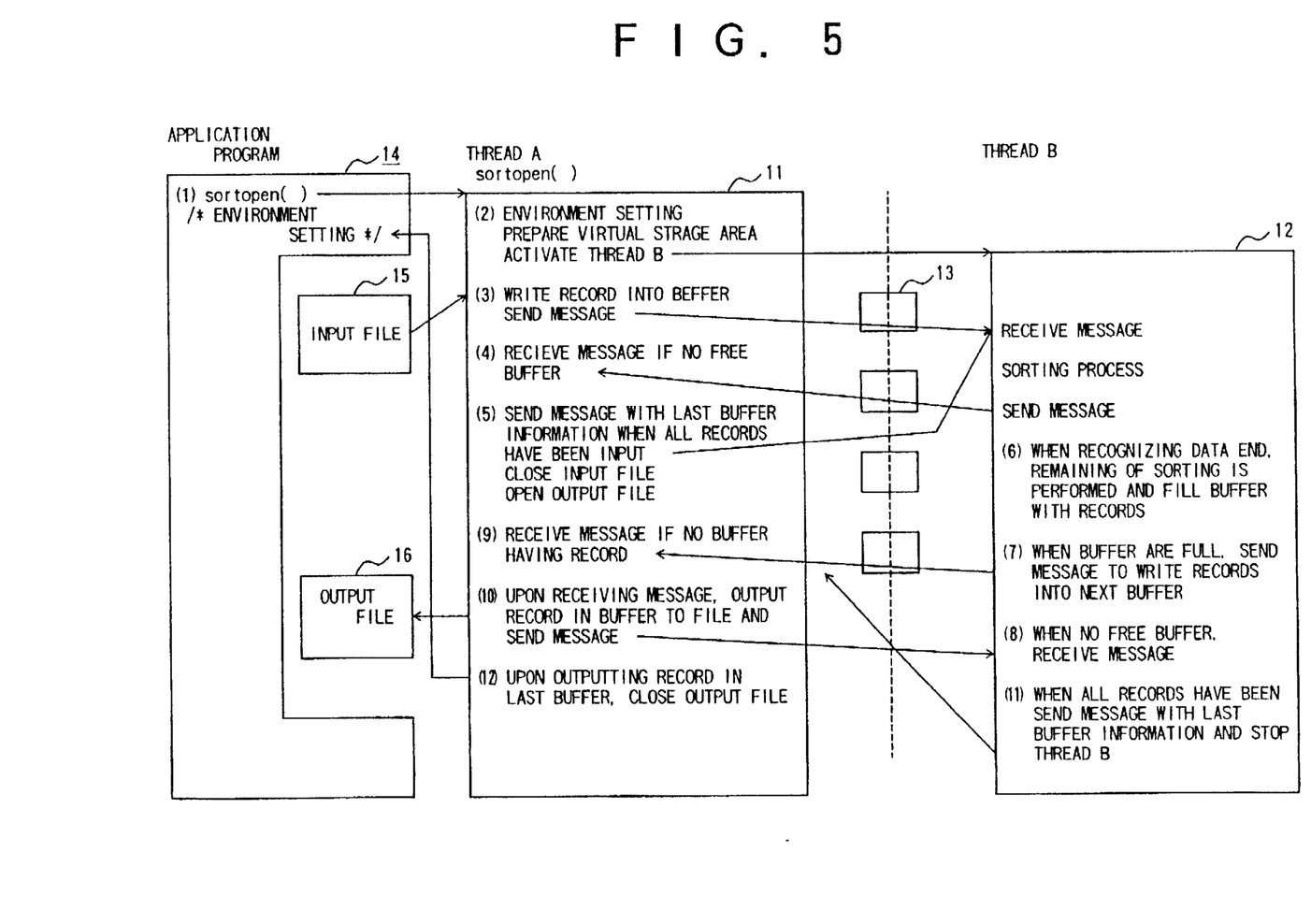
FIG. 5 is a diagram showing the operation of the variation of the first embodiment of the present invention shown in FIG. 2B.

FIG. 5 is a diagram indicating a sequence in which a record read from the input file 15 is given to the sorting program 12, which performs sorting and then sends a record after sorting to the output file 16.

In step (1), the application program 4 issues the environment setting function "sortopen ( )" for sorting. In this case, a parameter is specified which functions as file information and indicates that a record is input from the input file 15 and a record after sorting is output to the output file 16.

In step (2), the input/output program 11 receives the environment function "sortopen ( )" prepares an area for the thread B in the virtual storage area, and loads the sorting program 12 to the above area. Further, the input/output program 11 opens the input file 15. Then, the input/output program 11 returns the control right to the application program 14.

In step (3), the input/output program 11 reads records from the input file 15, and writes these records into the buffers 13 as many as possible. Then, the input/output program 11 sends a message to the thread B in order to request the thread B to perform the sorting program 12. If it is determined, in step (4), that there is no available area in the buffers 13, the input/output program 11 waits for a message from the thread B indicating that one of the buffers 13 have become free due to execution of sorting.

When it is determined, in step (5), that all records to be sorted have been passed to the input/output program 11, the sorting program 12 sends the thread A a message having information indicating the buffer 13 having the last record after sorting. Then the input/output program 11 closes the input file 15 and opens the output file 16.

When the sorting program 12 of the thread B recognizes the end of the data to be sorted in step (6), the thread B executes the remaining steps of the sorting program 12, and writes records after sorting into the buffers 13.

When the buffers are filled with records in step (7), the thread B sends a message to the input/output program 11 and then writes a record after sorting into the free buffer 13.

When there is no free buffer 13 in step (8), the thread B switches to a message receiving state in order to wait for a message indicating return of at least one buffer 13 from the input/output program 11.

When there is no buffer 13 having a record after sorting, the input/output program 11 of the thread A waits in step (9), in the message receiving state, for return of at least one buffer from the thread B.

When the input/output program 11 receives the message in step (10), it writes the record in the buffer 13 into the output file 16. When all the records after sorting have been written into the buffers 13 in step (11), the thread B sends a message with information indicating the buffer 13 having the last record to the thread A, and ends the sorting program 12.

In step (12), when the input/output program 11 of the thread A has output the last record to the output file 16, the input/output program 11 determines that all the records have been received, and closes the output file 16. Then, the input/output program 11 returns the control right to the application program 14.

As described above, the records read from the input file 15 of the thread A are passed to the input/output program 11 of the thread A, which writes these records into the buffers 13. Then, the sorting program 12 is carried out, and the records obtained by sorting are written into the buffers 13 and then transferred to the output file 16 of the thread A via the input/output program 11. Hence, it is possible to simultaneously operate the input/output program 11 of the thread A and the sorting program 12 of the thread B to perform sorting at high speed. In addition, it is possible to mutually and continuously access the stack areas of the application program 14 and the input/output program 11.

According to the first embodiment of the present invention, the input/output program 11 for records and the sorting program 12 are realized by respective CPU execution units. Hence, the sorting performance can be improved and the application program can easily utilize the sorting program. Further, transferring of records with respect to the application program 1 can be performed so that the input/output program 11 simply writes records into the buffers 13 and the records are simply read from the buffers 13 and returned to the application program 14. This contributes to improvement in the sorting performance. Furthermore, the input/output program 11 and the sorting program 12 can be simultaneously carried out. This contributes to improvement in the sorting performance.

A description will now be given of a second embodiment of the present invention.

In conventional open systems, files are assigned to a directory specified by an environment variable (a TMP in the DOS system and a TMPDIR in the UNIX system). Further, files assigned to the same directory are stored in the same storage disk. Hence temporary files into which data to be sorted is written are concentrated on the same disk. Accessing the disk is achieved by a mechanical operation. When a plurality of temporary files are assigned to the same disk, a long time is needed to write data to be sorted in the temporary files. The second embodiment of the present invention is intended to overcome the above problem.

Figure 6:
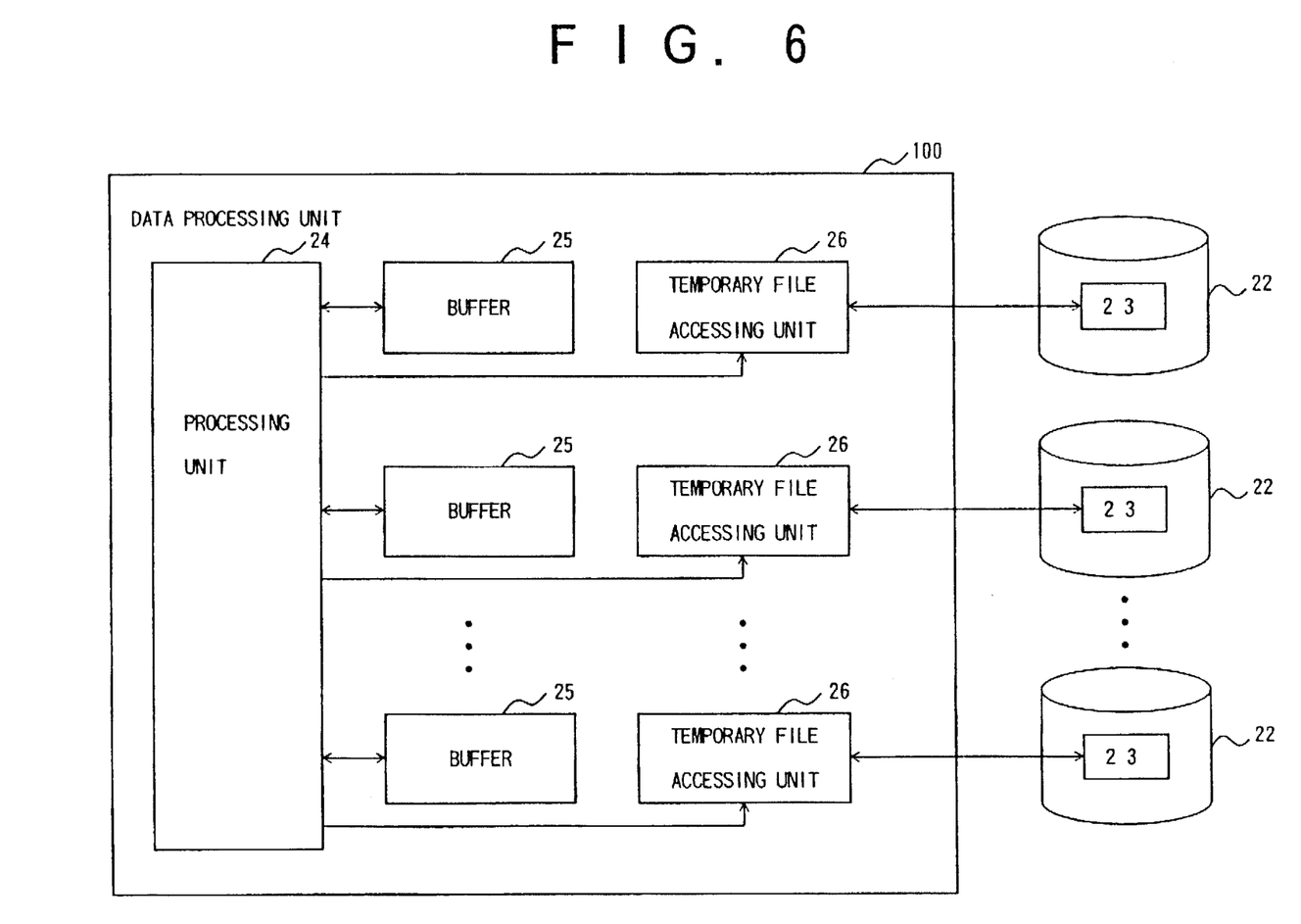
FIG. 6 is a block diagram of a second embodiment of the present invention.

FIG. 6 shows an overview of a data processing system equipped with a sorting system according to the second embodiment of the present invention. The data processing system shown in FIG. 6 includes a data processing unit 100, and a plurality of disk units 22, which store temporary files 23 having pieces of data to be sorted. The disk units 22 are, for example, magnetic disk units or optical disk units. The data processing unit 100 includes a processing unit 24, a plurality of buffers 25, and a plurality of temporary file accessing units 26. The processing unit 24 includes the aforementioned threads A and B. That is, the processing unit 24 executes the input/output program 11 and the sorting program 12 respectively using different CPU execution units. The buffers 25 are formed with respect to the respective temporary files 23. Pieces of data (records) relating to the sorting process are temporarily stored in the buffers 25. The temporary file accessing units 26, provided for the respective temporary files 23, instruct data transfer from the buffers 25 to the temporary files 23.

The temporary file accessing units 26 are formed with respective CPU execution units, which differs from those for the processing unit 24. For example, the temporary file accessing units 26 are formed with respective CPUS.

The processing unit 24 writes records to be sorted into the free buffers 25. When each buffer 25 becomes full of data, the processing unit 24 activates the corresponding temporary file accessing unit 26, which transfers the data stored in the buffer 25 to the corresponding temporary file 23 stored in the disk unit 22.

It should be noted that a plurality of temporary files 23 are distributed to a plurality of disk units 22, and hence two or more temporary files 23 can be simultaneously accessed. That is, the mechanical operations of the disk units 22 can be simultaneously carried out. Further, the processing in the processing unit 24 and the disk accessing by means of the temporary file accessing units 26 can be separately and simultaneously carried out.

Figure 7:
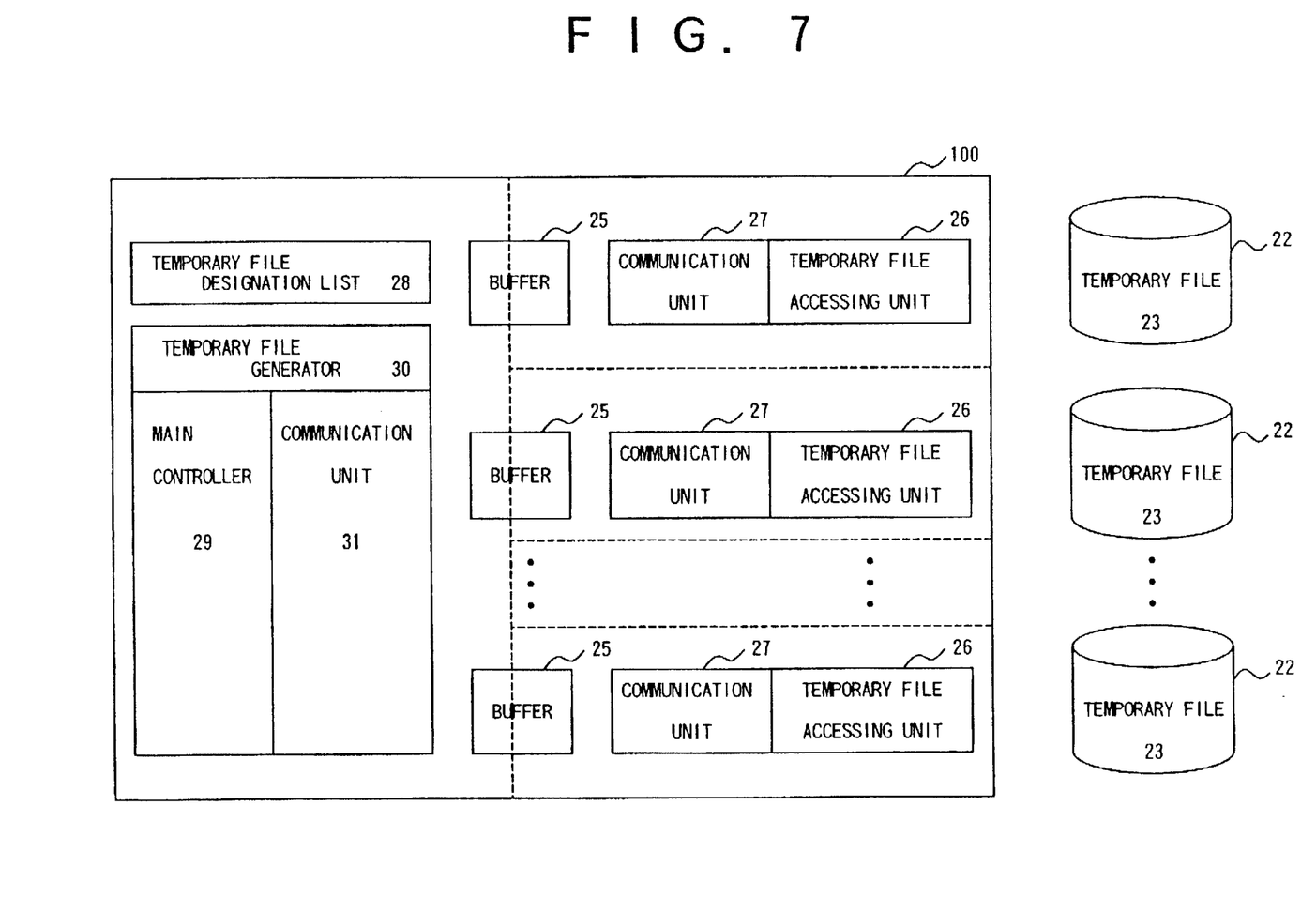
FIG. 7 is a block diagram of the second embodiment of the present invention in more detail.

FIG. 7 shows the second embodiment of the present invention in more detail. The connection lines connecting the structural elements to each other are omitted in FIG. 7 for the sake of simplicity. Each block indicated by broken lines corresponds to a single CPU. The processing unit 24 shown in FIG. 6 includes a temporary file designation list 28, a main controller 29, a temporary file generator 30, and a communication unit 31 by means of software. Each of the CPUs realizing the respective temporary file accessing unit 26 includes a communication unit 27 provided by means of software.

Figure 8:
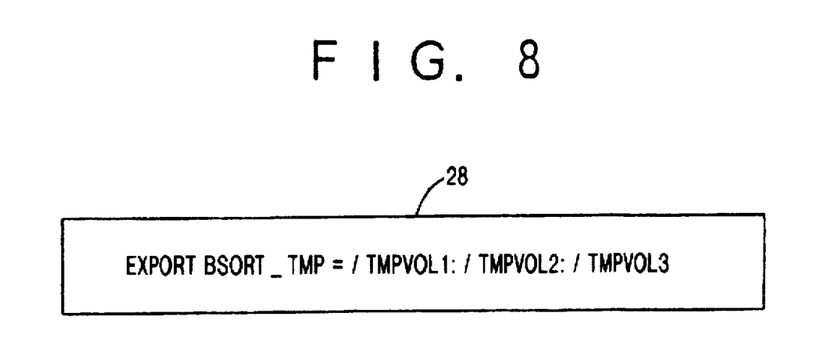
FIG. 8 is a diagram showing a temporary file designation list dsed in the second embodiment of the present invention.
Figure 9:
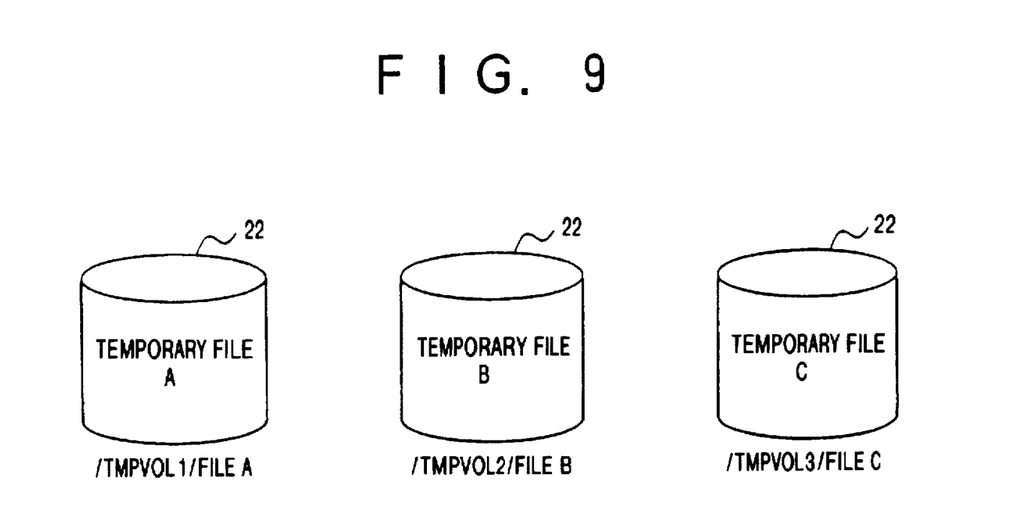
FIG. 9 is a block diagram showing how temporary files are generated.

FIG. 8 shows an example of the temporary file designation list 28, which designates a distributed arrangement in which temporary files are distributed to three directories "tmpvol1", "tmpvol2" and "tmpvol3" in the disk units 22. FIG. 9 shows an example of the temporary files established by the designation list 28 in FIG. 8. According to the temporary file designation list 28, the temporary file generator 30 generates temporary files A, B and C under the directories "tmpvol1", "tmpvol2" and "tmpvol3", respectively.

Figure 10:
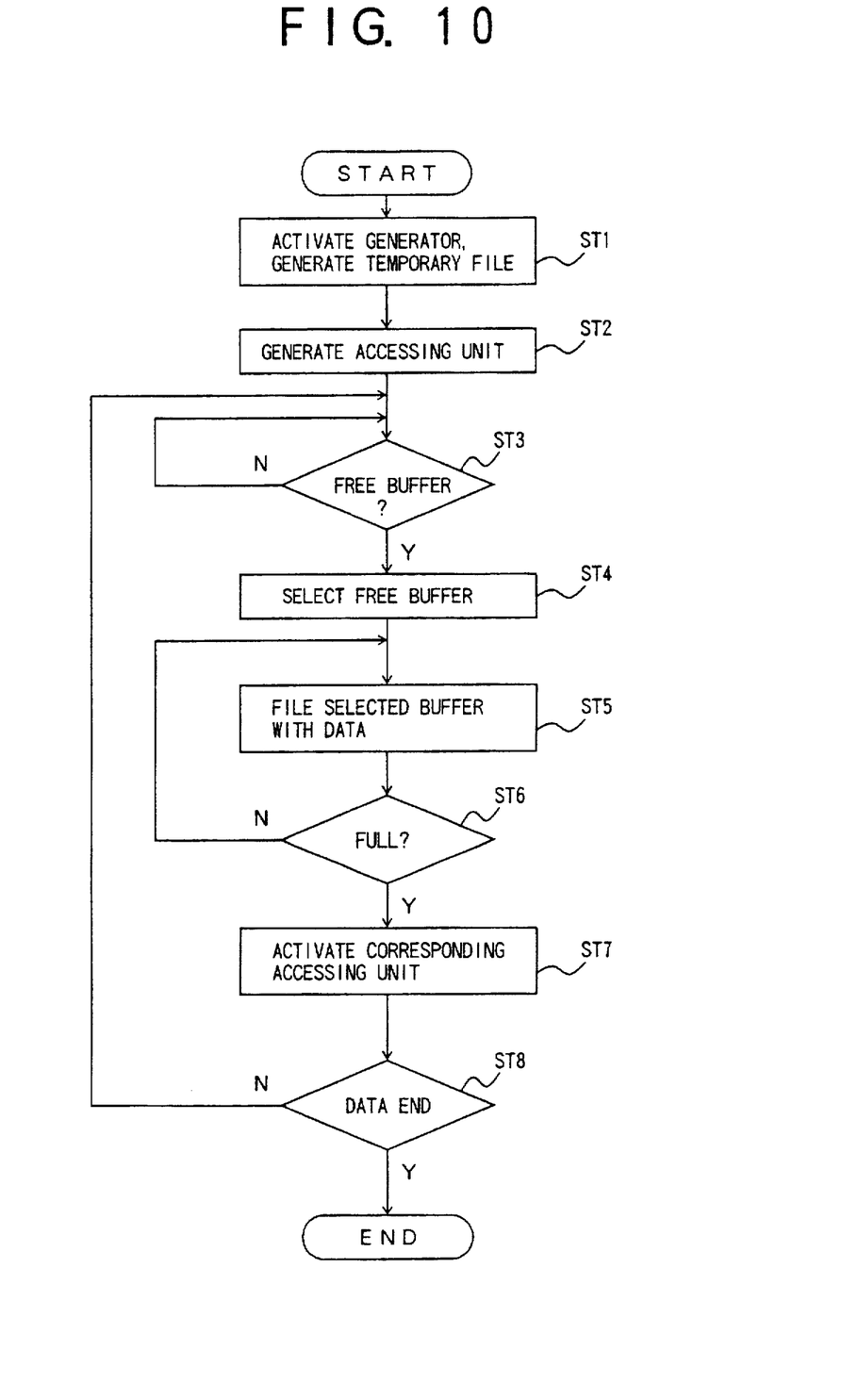
FIG. 10 is a flowchart of the operation of the second embodiment of the present invention.
Figure 11:
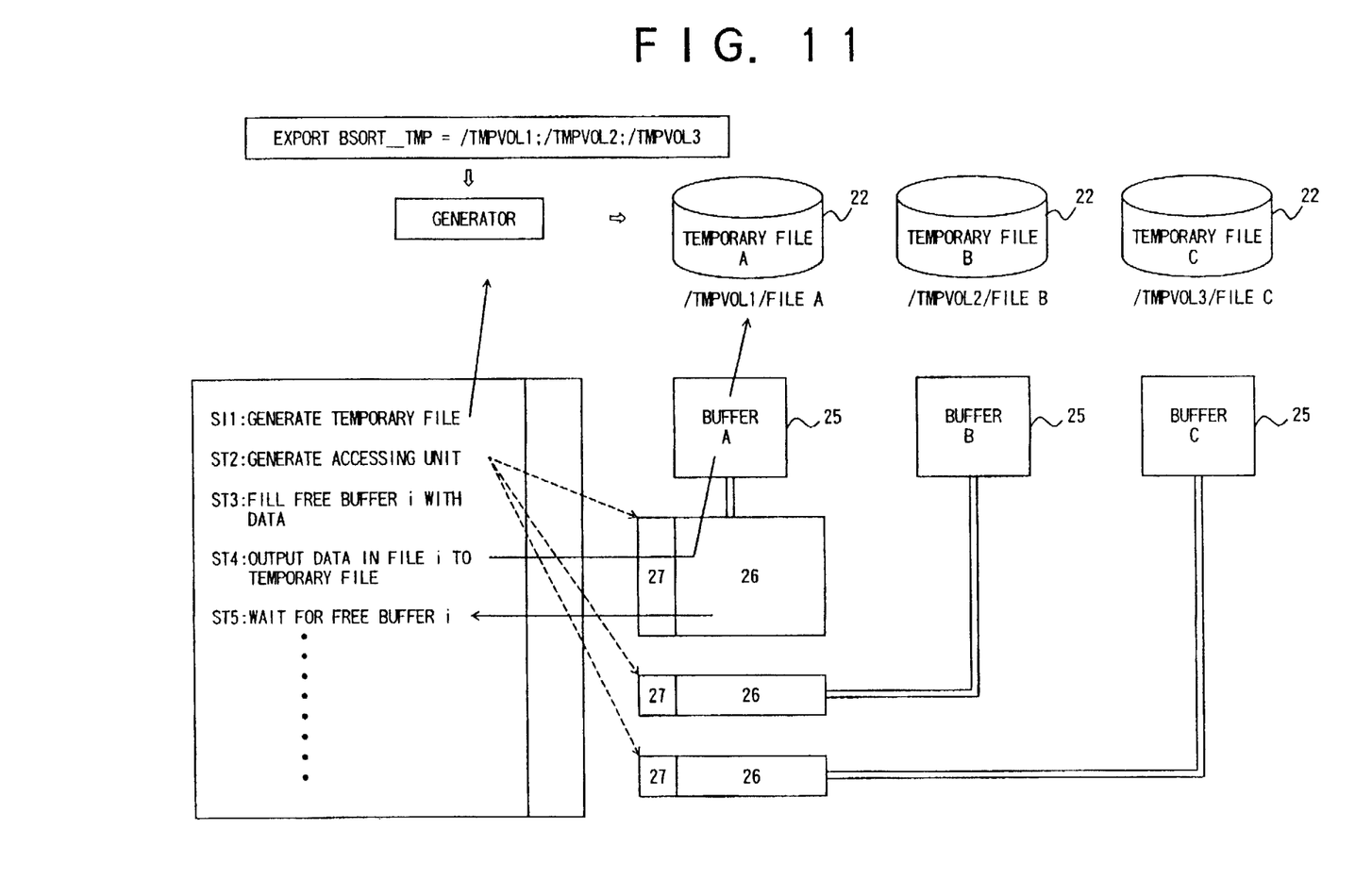
FIG. 11 is a block diagram illustrating a sequence of the operation of the second embodiment of the present invention.

FIG. 10 is a flowchart of the operation of the second embodiment of the present invention, and FIG. 11 is a block diagram showing the operation thereof. In step ST1, the main controller 29 activates the temporary file generator 30, and distributes the temporary files to the directories according to the temporary file designation list 28. In step ST2, the main controller 29 generates the temporary file accessing units 26 respectively relating to the temporary files 23, and generates the buffers 25 respectively relating to the temporary file accessing units 26.

Hence, the temporary files A, B and C are respectively arranged under the directories "tmpvol1", "tmpvol2" and tmpvol3l'. Further, the temporary file accessing units 26 and the buffers 25 are equal in number to the temporary files 23 are formed.

In step ST3, the main controller 29 determines whether at least one free buffer 25 is available. Step ST3 is repeatedly carried out until the result of step ST3 becomes YES. When the result of step ST3 becomes YES, the main controller 29 selects one of free buffers 25 in step ST4. Then the main controller 29 writes data to be sorted into the selected buffer 25 in step ST5 until the selected buffer 25 becomes full (step ST6). In the example shown in FIG. 11, data to be sorted is written into the temporary file A.

When it is determined, in step ST6, that the buffer 25 selected in step ST4 has become full, the main controller 29 accesses the corresponding temporary file accessing unit 26 in step ST7. As shown in FIG. 11, data to be sorted is then transferred to the temporary file 23 under the control of the temporary file accessing unit 26.

In step ST8, the main controller 29 determines whether all data to be sorted has been transferred to the temporary file 23. When the result of step ST8 is YES, the main controller 29 terminates the operation. When the result of step ST8 is NO, the main controller 29 returns to step ST3.

Figure 12:
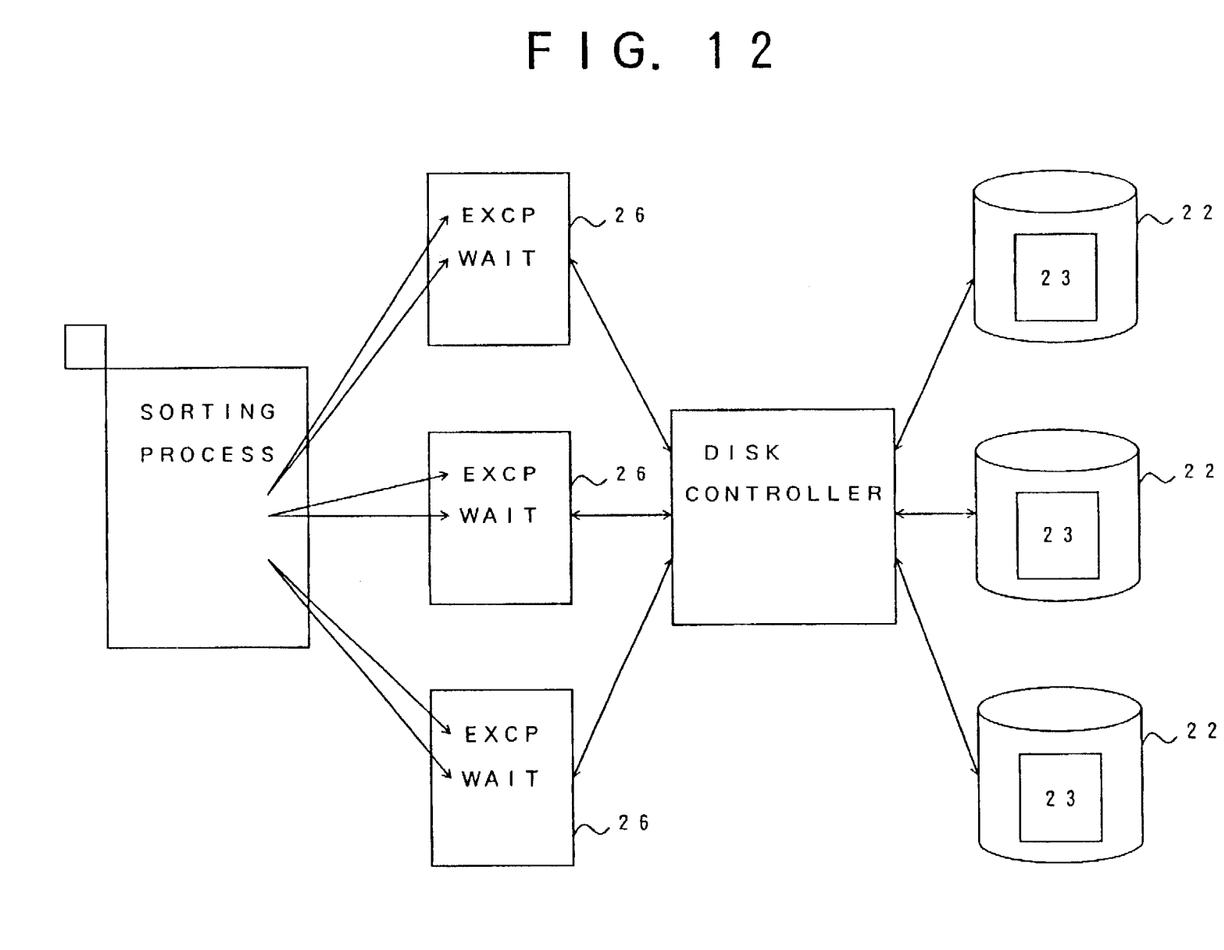
FIG. 12 is a block diagram illustrating the operation of the second embodiment of the present invention.

As shown in FIG. 12, each of the temporary file accessing units 26 generates the I/O instruction EXCP, which starts a disk controller connected to the disk units 22, and then generates an I/O instruction WAIT, which ends the accessing operations on the disk units 22.

According to the second embodiment of the present invention, the temporary file access based on the mechanical operation of the disk units is controlled by the CPU execution units separately from the CPU execution units of the processing unit 24 performing the sorting process. Hence, the sorting process and the input/output process can be simultaneously performed.

Further, a plurality of temporary files are distributed to a plurality of disk units, and temporary file accessing units are formed with respective CPUs. Hence, it is possible to avoid conflict between the input and output processes.

It is possible to replace the disk units with semiconductor integrated circuit memories.

The present invention is not limited to the specifically disclosed embodiments, and variations and modifications may be made without departing from the scope of the present invention.

What is claimed is:

1. A sorting system for sorting records in a data processing system comprising:

buffers for storing the records;

a second thread for performing a sorting process on the records in the buffers and the writing the records into the buffers after the sorting process is completed; and a first thread for performing an input/output process for writing records received from an application program, which called the sorting system and controls execution of said first thread, into the buffers to be sorted by the second thread and transferring the records after sorting to the application program in parallel with the sorting process performed by the second thread.

2. The sorting system as claimed in claim 1, wherein the first thread and the second thread are CPU execution units operating in a time sharing manner.

3. The sorting system as claimed in claim 1, wherein:

the first thread comprises a first stack structure in which the application program and a program for performing the input/output process are sequentially arranged; and the second thread comprises a second stack structure in which a program for performing the sorting process is arranged.

4. The sorting system as claimed in claim 1, further comprising:

a plurality of storage units having a plurality of temporary files;

a second group of buffers coupled to the second thread for use in performing the sorting process; and control means for performing a first process for writing the records to be sorted from the buffers into the second group of buffers to be sorted by the second thread and reading the sorted records from the second group of buffers to the buffers and for performing a second process for transferring the records from the second group of buffers to the plurality of temporary files in the plurality of storage units second group of buffers are full.

5. The sorting system as claimed in claim 4, wherein said control means comprises temporary file accessing means for performing an access control for the plurality of temporary files relating to the second process.

6. The sorting system as claimed in claim 5, wherein the temporary file accessing means comprises a plurality of CPU execution units.

7. The sorting system as claimed in claim 5, wherein the temporary file accessing means comprise a plurality of CPU execution units and the first thread and the second thread comprise separate CPU execution units.

8. The sorting system as claimed in claim 4, wherein the plurality of storage units comprise disk units.

9. The sorting system as claimed in claim 4, wherein the plurality of storage units comprise semiconductor integrated circuit memories.

10. The sorting system as claimed in claim 1, wherein:

the first thread comprises a first stack structure in which the application program and a program for performing the input/output process are sequentially arranged; and the second thread comprises a second stack structure in which a program for performing the sorting process is arranged.

11. A sorting system for a data processing system comprising:

an input file;

an output file;

a first group of buffers;

a second thread for performing a sorting process on the records in the buffers and writing the records into the buffers after the sorting process is completed;

a first thread, whose execution is controlled by an application requesting the input file be sorted, for performing an input/output process for writing records read from the input file into the buffers and transferring the records after being sorted by the second thread to the output file in parallel with the sorting process of the second thread.

12. The sorting system as claimed in claim 11, wherein the first thread and the second thread are CPU execution units operating in a time sharing manner.

13. The sorting system as claimed in claim 11, further comprising:

a plurality of storage units having a plurality of temporary files;

a second group of buffers coupled to the second thread for use in performing the sorting process; and control means for performing a first process for writing the records to be sorted from the buffers into the second group of buffers to be sorted by the second thread and reading the sorted records from the second group of buffers to the buffers and for performing a second process for transferring the records from the second group of buffers to the plurality of temporary files in the plurality of storage units when the second group of buffers are full.

14. The sorting system as claimed in claim 13, wherein said control means comprises temporary file accessing means for performing an access control for the plurality of temporary files relating to the second process.

15. The sorting system as claimed in claim 14, wherein the temporary file accessing means comprise a plurality of CPU execution units.

16. The sorting system as claimed in claim 14, wherein the temporary file accessing means comprise a plurality of CPU execution units and the first thread and the second thread comprise separate CPU execution units.

17. The sorting system as claimed in claim 13, wherein the plurality of storage units comprise disk units.

18. The sorting system as claimed in claim 13, wherein the plurality of storage units comprise semiconductor integrated circuit memories.

* * * * *